July 5, 1949. E. L. ROUSSELLE 2,475,405
LAMP SHADE
Filed Nov. 14, 1946
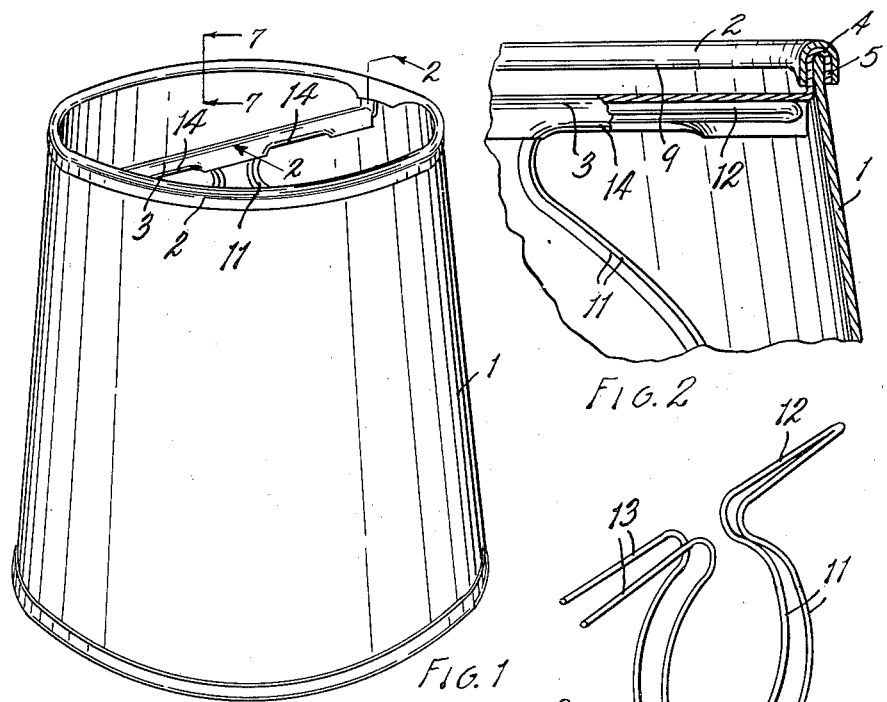
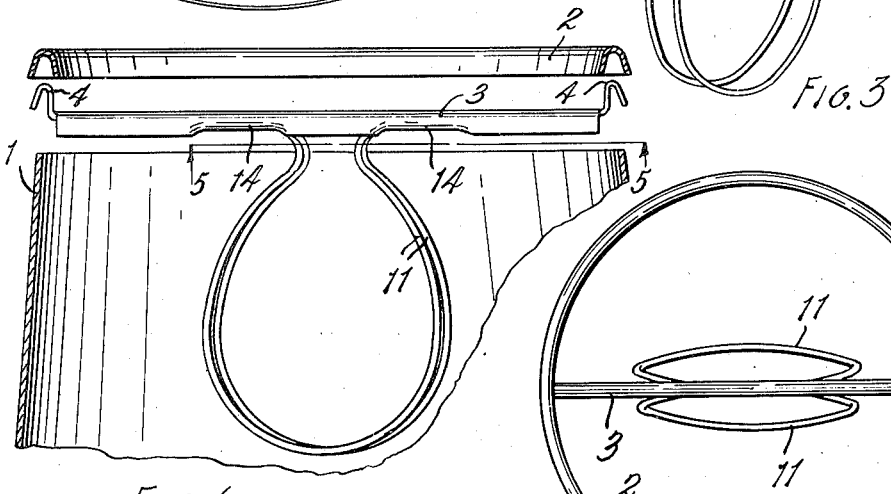
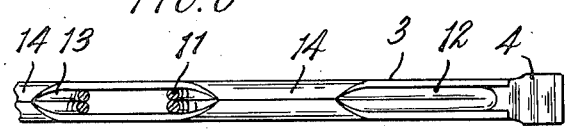
INVENTOR
Edward L. Rousselle
Attorney Patented July 5, 1949

2,475,405

UNITED STATES PATENT OFFICE 2,475,405

LAMP SHADE

Edward L. Rousselle, Benton Harbor, Mich.

Application November 14, 1946, Serial No. 709,694

1 Claim. (Cl. 240—108)

This invention relates to improvements in lamp shades.

The main objects of this invention are:

First, to provide a lamp shade which may be very economically produced and at the same time one which is highly attractive in appearance.

Second, to provide a lamp shade in which the parts are quickly and easily assembled and at the same time securely connected.

Further objects relating to details and economies of the invention will appear from the description to follow. The invention is defined in the claim.

A structure which embodies the features of the invention is illustrated in the accompanying drawing, in which:

Fig. 1 is a perspective view of a lamp shade embodying my invention.

Fig. 2 is an enlarged fragmentary view partially in vertical section on a line corresponding to line 2—2 of Fig. 1.

Fig. 3 is a perspective view of the lamp engaging members prior to assembly with the cross bar.

Fig. 4 is a plan view.

Fig. 5 is a fragmentary view in horizontal section on a line corresponding to line 5—5 of Fig. 6.

Fig. 6 is a fragmentary exploded view showing structural features and relation of the parts prior to assembling.

Fig. 7 is a fragmentary sectional view on line 7—7 of Fig. 1.

In the accompanying drawing, the shade body 1 is upwardly tapered or of general open ended conical shape and is desirably formed of a fibrous material such as parchment, which is relatively stiff and translucent. The annular rim 2 is of downwardly facing channel section and desirably formed of light sheet metal. The cross bar 3 is also of downwardly facing channel section and desirably formed of light sheet metal and has upwardly offset downwardly facing hooks 4 at its ends, these hooks being engaged over and clamped upon the upper edge of the body as shown at 5 in Fig. 2.

The rim 2 closely embraces the hooks, the edges of the rim being clamped upon the upper edge of the body as shown in Fig. 7.

The outer edge 8 of the rim extends substantially below the inner edge and in clamping the rim on the body, the inner edge is turned inwardly, thereby imparting to or forming an inwardly directed flange portion 9 the upper edge of the body 1, this resulting in secure clamping engagement and providing a rounded rim surface 10 of substantial arc. The flanges of the rim embracing the hooks 4 of the cross bar are substantially straight, that is, hooks are not distorted but are further clamped upon the body when the rim is rolled into clamping engagement therewith.

The lamp engaging members 11 are in the form of wire loops having arms 12 and 13 which are disposed in the channel of the cross bar and secured therein by clamping and flanges of the cross bar around the arms, as best shown at 14 in Fig. 5. The lamp engaging loops 11 are springably adapted to slip over the bulb of the lamp to support the shade.

In the embodiment illustrated they are formed of a single piece of wire, the arm 12 resulting from folding the wire upon itself prior to forming the loops. The downward offsetting of the cross bar results in a very attractive structure, and the forming of the cross bar and the rim separately and assembling as illustrated results not only in an attractive structure but one which may be very economically produced and one in which there is relatively little scrap material.

While the rims are formed out of flat stock, the shades are made in a variety of sizes and the rim blanks may be cut concentrically from the sheets. The cross bars and lamp-engaging members can be assembled in quantities by very simple operations, and quickly assembled with the body and the rim.

The lamp engaging members 11 are effective for directly engaging the bulbs of the lamps. However, other forms are provided where the shade is to be mounted on a support or part of a lamp other than the bulb.

I have not illustrated the various adaptations and embodiments which I contemplate, as it is believed that this disclosure will enable those skilled in the art to embody or adapt my invention as may be desired.

Having thus described the invention, what is claimed as new and desired to be secured by Letters Patent is:

A lamp shade comprising an upwardly tapered open body of fibrous material of substantial rigidity, an annular sheet metal rim of bendable sheet metal and downwardly facing channel section embracing and clamped upon the upper edge of the body, a cross bar of bendable sheet metal and of downwardly facing channel section and having upwardly offset downwardly facing hooks at its ends engaged over the upper edge of the body and clamped thereon, said rim being arranged over and tightly embracing said hooks, and springable lamp engaging loops having laterally disposed ends arranged in the channel of the cross bar with the edges of the channel in retaining engagement therewith.

EDWARD L. ROUSSELLE.

REFERENCES CITED

The following references are of record in the file of this patent:

UNITED STATES PATENTS

| Number | Name | Date |
| --- | --- | --- |
| 1,726,452 | Pride | Aug. 27, 1929 |
| 1,955,684 | Rezofsky | Apr. 17, 1934 |
| 2,038,501 | Planeta | Apr. 21, 1936 |
| 2,269,128 | Ross | Jan. 6, 1942 |